US012761992B2

(12) United States Patent
Lashvicher et al.

(10) Patent No.: US 12,761,992 B2
(45) Date of Patent: Oct. 13, 2026

(54) AUTOMATIC ENDPOINT DISCOVERY SYSTEMS AND METHODS

(71) Applicant: INTUIT INC., Mountain View, CA (US)

(72) Inventors: Kiril Lashvicher, Tel Aviv (IL); Yossi Barshishat, Tel Aviv (IL); Shirley Avishour, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 447 days.

(21) Appl. No.: 18/424,528

(22) Filed: Jan. 26, 2024

(65) Prior Publication Data

US 2025/0245082 A1 Jul. 31, 2025

(51) Int. Cl.
*G06F 9/54* (2006.01)

(52) U.S. Cl.
CPC .................................... *G06F 9/547* (2013.01)

(58) Field of Classification Search
CPC .... G06F 9/547; G06F 16/9566; G06F 16/955; G06F 18/15; G06F 18/20; G06F 18/21; G06F 18/211; G06F 18/2113; G06F 18/2115; G06F 18/213; G06F 18/21342; G06F 18/21345; G06F 18/2137; G06F 18/22; G06F 18/231; G06F 18/2321; G06F 18/24; G06F 18/2413; G06F 18/24133; G06F 18/2415; G06F 18/24765; G06F 18/253; G06F 18/26; G06F 18/30; H04L 67/02
See application file for complete search history.

(56) References Cited

U.S. PATENT DOCUMENTS

| | | | | |
|---|---|---|---|---|
| 8,631,097 | B1 * | 1/2014 | Seo | G06F 16/9577 709/219 |
| 10,073,918 | B2 * | 9/2018 | Lipin | G06F 16/955 |
| 2009/0164502 | A1 * | 6/2009 | Dasgupta | G06F 16/9566 707/999.102 |
| 2009/0275313 | A1 * | 11/2009 | Haleva | G06F 21/10 455/414.1 |
| 2011/0041053 | A1 * | 2/2011 | Liang | G06F 16/9574 715/234 |

(Continued)

FOREIGN PATENT DOCUMENTS

CN 115776466 A * 3/2023

*Primary Examiner* — April Y Blair
*Assistant Examiner* — Zhi Chen
(74) *Attorney, Agent, or Firm* — DLA PIPER LLP US

(57) ABSTRACT

At least one processor may receive a plurality of uniform resource locator (URL) paths each comprising a respective one or more hierarchical path segments and divide each of the plurality of URL paths into tokens. The at least one processor may determine that at least one first hierarchical level of the plurality of URL paths represents at least one resource by performing a first statistical analysis and may determine that at least one second hierarchical level of the plurality of URL paths represents at least one variable by performing a second statistical analysis. The at least one processor may determine a standard format of the plurality of URL paths comprising the at least one resource and the at least one variable and perform processing utilizing the standard format for an application programming interface (API) associated with the plurality of URL paths.

18 Claims, 7 Drawing Sheets

400

500

(56) References Cited

U.S. PATENT DOCUMENTS

| | | | | |
|---|---|---|---|---|
| 2011/0066585 | A1* | 3/2011 | Subrahmanyam | G06N 7/01<br>706/52 |
| 2013/0124755 | A1* | 5/2013 | Haywood | G06F 16/9566<br>709/238 |
| 2017/0193074 | A1* | 7/2017 | Vellal | G06F 16/24568 |
| 2019/0361998 | A1* | 11/2019 | Meron | G06F 16/90344 |
| 2020/0175174 | A1* | 6/2020 | Bakalli | G06F 8/71 |

* cited by examiner

500

AUTOMATIC ENDPOINT DISCOVERY SYSTEMS AND METHODS

BACKGROUND

Application programming interfaces (APIs) are software interfaces that allow two or more computer programs to communicate with one another. APIs expose objects or actions within a program that can be manipulated or inquired from outside the program. Other programs make API calls to these exposed elements and thereby manipulate them without requiring information about how the program works internally. APIs are powerful tools that simplify computer interactions, but as only certain elements are exposed, they present difficulties in monitoring the ongoing operations of a computer program or set of computer programs.

For example, in order to monitor or analyze web API traffic, such as representational state transfer (REST) API, an appliance or an algorithm may try to group API traffic transactions according to endpoint (e.g., where an endpoint is an HTTP path). However, an endpoint may include parameter fields that may be very difficult to identify and to distinguish from path segment fields produced autonomously by artificial intelligence (AI) machines. The following example illustrates the problem. Consider the following uniform resource locators (URLs):

1. "https://api.sample.com/api/v1/user/1a2-3b4-bc5?queryField=17"

The endpoint is "/api/v1/user/1a2-3b4-bc5", but the path by which the address should be grouped is "/api/v1/user/{user-id}" and the variable 1a2-3b4-bc5 is an instance of the parameter user-id.

2. "https://api.sample.com/api/v4/company/tech?param=sdjfh"

It is unclear from this example if the 'tech' is a variable and the path is "/api/v4/company/{company-name}" or tech is static and the path is "/api/v4/company/tech".

Computing systems often must automatically identify such addresses in order to communicate with one another or in order to analyze the messages. The automatic identification of variables is a complex task, and in many cases, by looking at a few samples it is impossible to deduce the variables (e.g., as in example 2 above). Accordingly, automatic systems and methods for identifying addresses generally require large amounts of different samples of the same endpoint to identify the variables properly, resulting in processing complexity and inflexibility to changes in endpoints.

BRIEF DESCRIPTIONS OF THE DRAWINGS

DETAILED DESCRIPTION OF SEVERAL EMBODIMENTS

Systems and methods described herein can automatically identify addresses used in API web traffic and/or other applications with significantly reduced processing complexity and increased flexibility relative to other systems and methods. For example, embodiments described herein can automatically differentiate between variable names and resource names within URLs and use this information to automatically arrive at a standard format for the API that employs the URLs. This enables many kinds of additional processing, including, but not limited to, endpoint analysis, records collection, transaction analysis, and facilitating automated communication with the API without user intervention.

The embodiments described herein can classify endpoints (e.g., HTTP paths or URLs) by splitting endpoints into tokens according to hierarchical path segments and determining whether each respective token represents a resource or a variable. For example, as described in detail below, a URL may be as follows:

https://api.sample.com/band/98765432/member/rogerwaters having an endpoint as follows:

/band/98765432/member/rogerwaters.

Through processing described herein, this endpoint may be standardized as follows:

/band/{band-id}/member/{member-id}, for example.

The embodiments described herein may include at least one or two phases of processing. For example, a first phase may identify "easy cases" and classify them correctly using a heuristic approach. A second phase may address the "hard cases" using an algorithmic approach. If the first phase is used, the second phase's dataset can exclude noise that should have been cleared in the first phase. The following description provides details of both processing phases and other features of the disclosed systems and methods.

Figure 1:
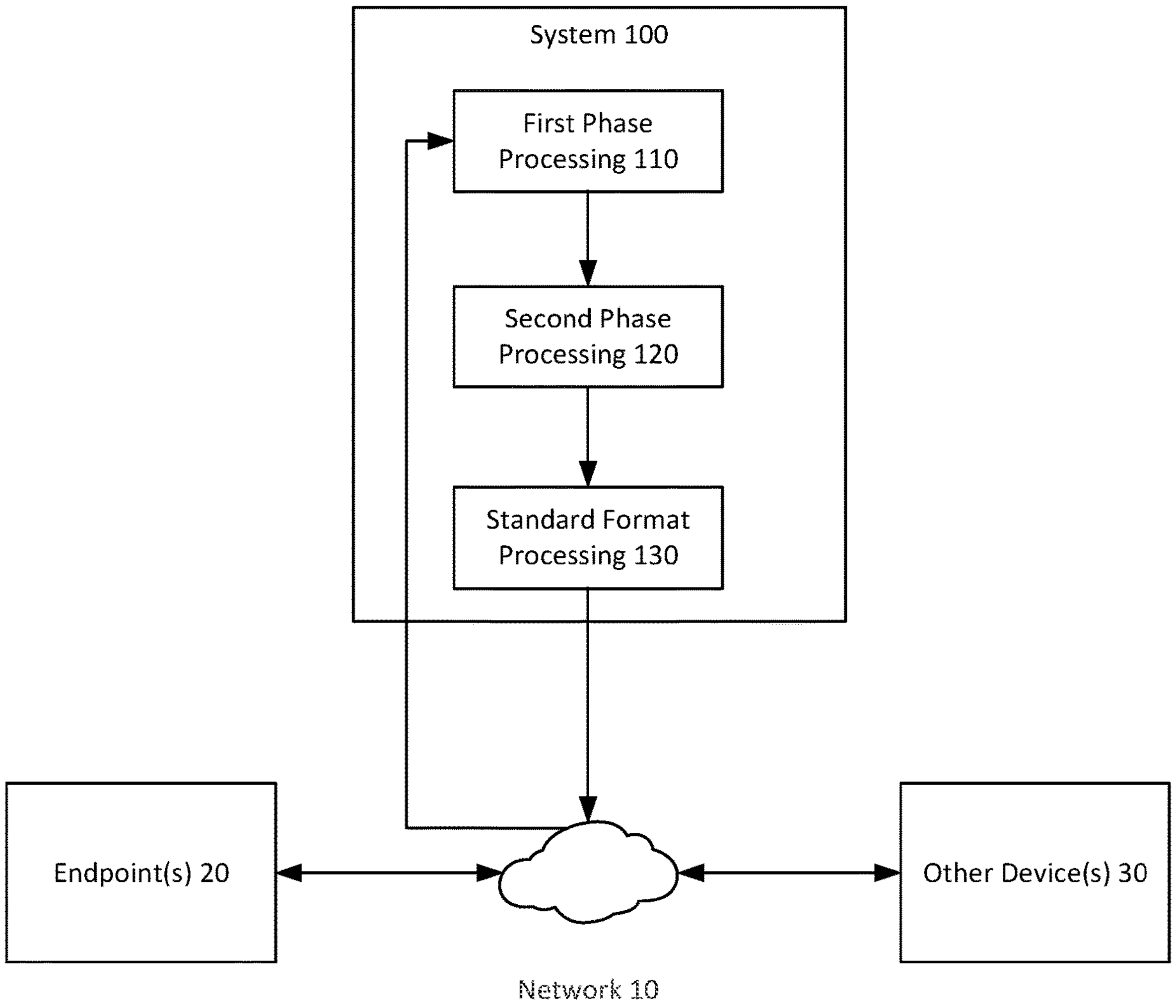
FIG. 1 shows an example automatic endpoint discovery system according to some embodiments of the disclosure.

FIG. 1 shows an example of an automatic endpoint discovery system 100 according to some embodiments of the disclosure. System 100 may include a variety of hardware, firmware, and/or software components that interact with one another, such as first phase processing 110, second phase processing 120, and/or standard format processing 130. The operations of first phase processing 110, second phase processing 120, and standard format processing 130 are described in greater detail below, but in general, first phase processing 110 and second phase processing 120 may be first and second automatic endpoint discovery processing elements using a variety of processing techniques such as machine learning (ML) models and/or other heuristic processing. Standard format processing 130 may be configured to apply the results of automatic endpoint discovery, for example in communication with endpoint(s), traffic analysis for endpoint(s), or the like. Some components may communicate with one another and/or with endpoint(s) 20 and/or other device(s) 30, through one or more networks 10 (e.g., the Internet, an intranet, and/or one or more networks that provide a cloud environment). For example, as described in detail below, system 100 can obtain network 10 traffic data between an endpoint 20 and other devices, or data descriptive thereof, for processing. In another example, as described in detail below, system 100 can enable processing by other device 30 such as traffic analysis and/or improved communication with endpoint 20. FIGS. 2-6 provide details about the processing performed by system 100.

In some embodiments, system 100 components can be provided by separate computing devices communicating with one another through network 10 or some other connection(s). For example, first phase processing 110, second phase processing 120, and/or standard format processing 130 may be respectively provided within different computing environments connected by network 10. In other embodiments, first phase processing 110, second phase processing 120, and/or standard format processing 130 may be part of the same computing environment. Other combinations of computing environment configurations may be possible. Each component may be implemented by one or more computers (e.g., as described below with respect to FIG. 7).

Elements illustrated in FIG. 1 (e.g., system 100 including first phase processing 110, second phase processing 120, and/or standard format processing 130), network 10, endpoint 20, and/or other device 30) are each depicted as single blocks for ease of illustration, but those of ordinary skill in the art will appreciate that these may be embodied in different forms for different implementations. For example, while first phase processing 110, second phase processing 120, and standard format processing 130 are depicted separately, any combination of these elements may be part of a combined hardware, firmware, and/or software element. Likewise, while first phase processing 110, second phase processing 120, and standard format processing 130 are each depicted as parts of a single system 100, any combination of these elements may be distributed among multiple logical and/or physical locations. Moreover, FIG. 1 shows respective single instances of first phase processing 110, second phase processing 120, and standard format processing 130 for ease of explanation of certain operations. However, varying numbers of instances of first phase processing 110, second phase processing 120, and/or standard format processing 130 may be possible in various embodiments. Also, while one network 10, one endpoint 20, one other device 30, and one system 100 are illustrated, this is for clarity only, and multiples of any of the above elements may be present. In practice, there may be single instances or multiples of any of the illustrated elements, and/or these elements may be combined or co-located.

Figure 2:
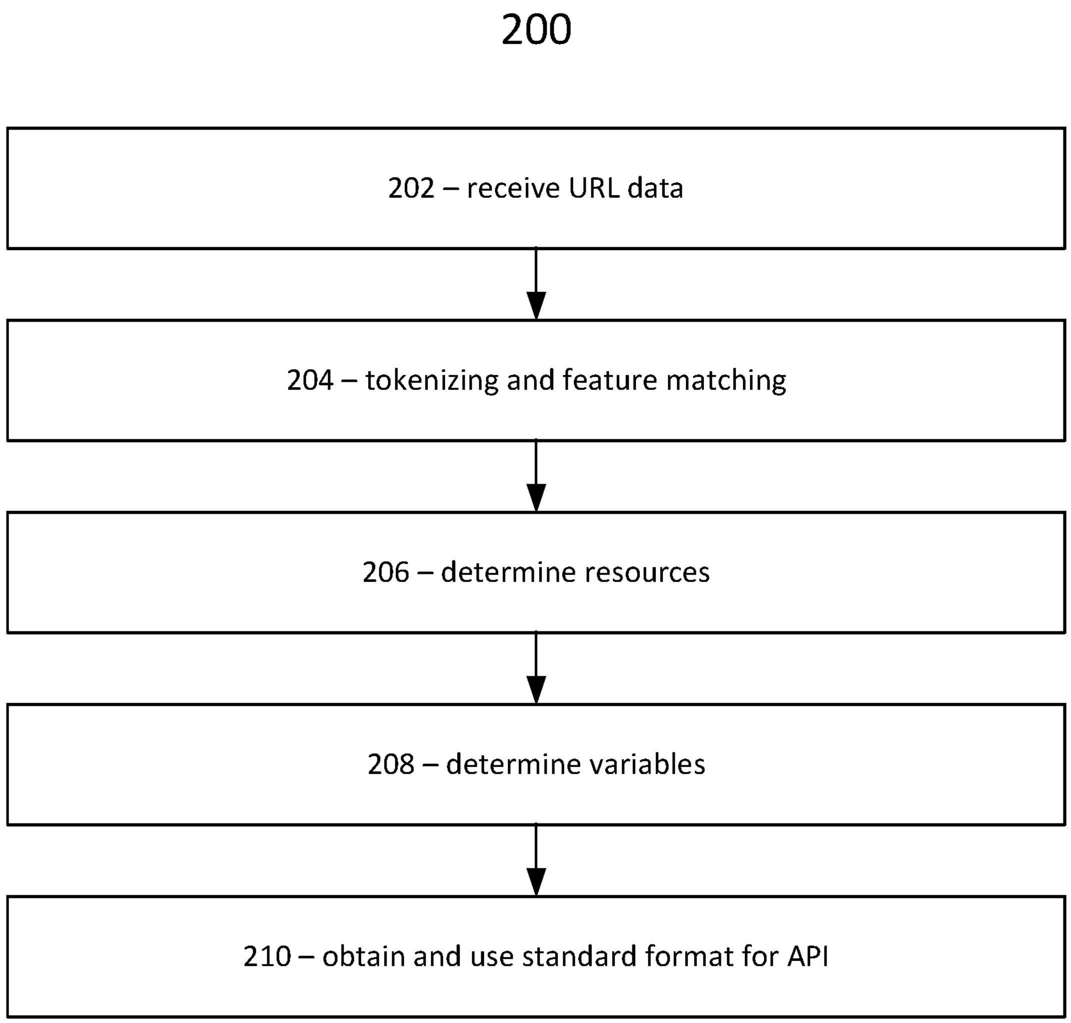
FIG. 2 shows an example automatic endpoint discovery process according to some embodiments of the disclosure.

FIG. 2 shows an example automatic endpoint discovery process 200 according to some embodiments of the disclosure. System 100 can perform process 200 to automatically determine a standard format used by an API of an endpoint 20, for example. This can allow system 100 and/or one or more other devices 30 to monitor traffic to and from endpoint 20 on network 10 and/or to interact with endpoint 20 using its API, for example.

At 202, system 100 can receive data indicative of traffic to and/or from endpoint 20. For example, this data can include a plurality of URLs, or portions thereof, each comprising a respective one or more hierarchical path segments. As in the example presented above, a URL may be of a form such as the following:

"https://api.sample.com/api/v1/user/1a2-3b4-bc5?queryField=17", and in this URL, the endpoint is "/api/v1/user/1a2-3b4-bc5".

System 100 can receive the entire URL and remove everything but the endpoint (e.g., everything to the left of the top level domain, inclusive of the top level domain, and the query string), or system 100 can receive only the endpoint after prior processing has removed the other portions of the URL. One URL is presented in this example, but it should be understood that system 100 can receive multiple URLs or portions thereof and process them all.

At 204, system 100 (e.g., first phase processing 110) can perform tokenizing and feature matching processing on the data received at 202. By this processing, system 100 can produce respective tokens for respective hierarchical path segments of at least a subset of the URLs. For example, for each endpoint, system 100 can split the endpoint into tokens using each "/" to define token boundaries. Each level may define a different level of a trie data structure. That is, each level of the URL may define the tokens such that tokens may be given as /{token level 1}/{token level 2}/{token level 3}/etc., where each of "level 1", "level 2", and "level 3" are different trie structure levels. This is illustrated in greater detail in examples below.

Once the URL has been split into tokens, system 100 can perform a first heuristic phase to identify known formats for variables in some embodiments (other embodiments may omit the first heuristic phase). The first heuristic phase may allow system 100 to quickly classify some levels of the trie and therefore some parts of the URL. If a token has a predefined format, system 100 can classify the token as a variable. All other tokens in the same level that apply the same format may be merged together to a single variable (i.e., a single node in the trie), and all the sub-tries under these tokens may be reduced under this new variable node. The first heuristic phase is described in detail below with respect to FIG. 3.

At 206, system 100 (e.g., second phase processing 120) can determine tokens, and therefore trie levels, that represent resources for those tokens not identified at 204. System 100 can determine resources using a first statistical algorithm that is based on the variance of the various tokens at the same hierarchy. This process may be summarized as automatically determining that at least one first hierarchical level of the plurality of URLs represents at least one resource by determining that at least one number of occurrences of at least one parent token to the at least one of the respective tokens is above a first threshold and determining that at least one ratio of occurrence of at least one parent token to the at least one of the respective tokens is above a second threshold. This first portion of a second heuristic phase is described in detail below with respect to FIG. 4.

At 208, system 100 (e.g., second phase processing 120) can determine tokens, and therefore trie levels, that represent variables for those tokens not identified at 204. System 100 can determine resources using a second statistical algorithm that is based on the variance of the various tokens at the same hierarchy. This process may be summarized as automatically determining that at least one second hierarchical level of the plurality of URLs represents at least one variable by determining that a number of occurrences of distinct values in tokens of the at least one second hierarchical level is above a third threshold. This second portion of a second heuristic phase is described in detail below with respect to FIG. 5.

At 210, system 100 (e.g., standard format processing 130) can obtain a standard format for the endpoint data based on the processing at 202-208 and use it to perform one or more actions related to the API or other features of endpoint 20. For example, system 100 can automatically determine a standard format of the plurality of URLs comprising the at least one resource and the at least one variable. For example, this can be a completed trie structure. System 100 and/or other devices 30 can then perform processing utilizing the standard format for an API associated with the plurality of URLs, for example including generating an analysis of traffic for the API of endpoint 20 and/or communicating with the API of endpoint 20.

Figure 3:
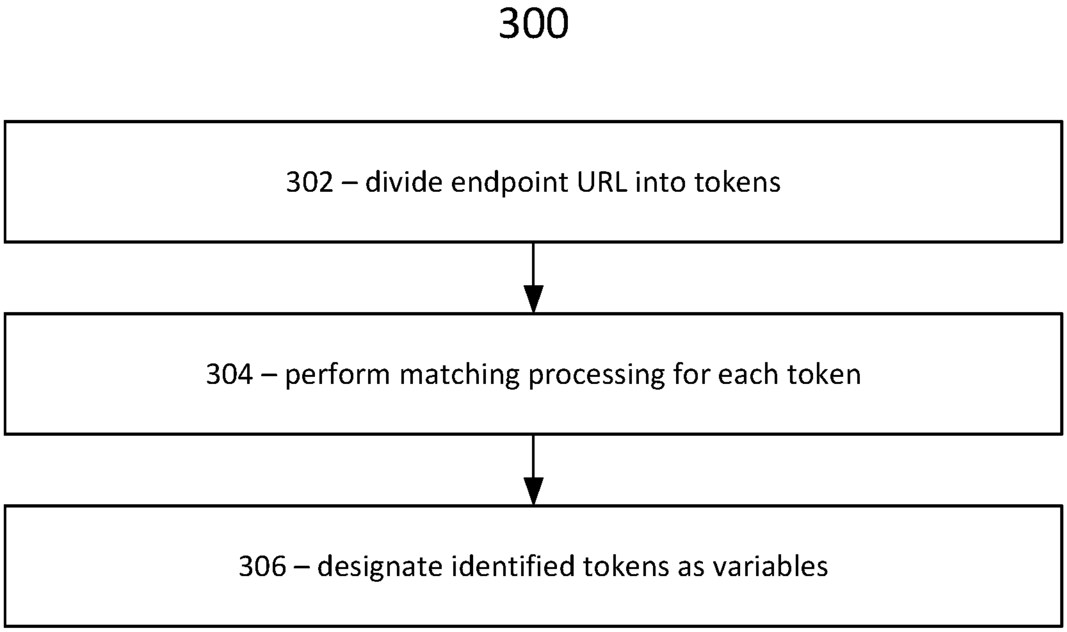
FIG. 3 shows an example first heuristic phase process according to some embodiments of the disclosure.
Figure 4:
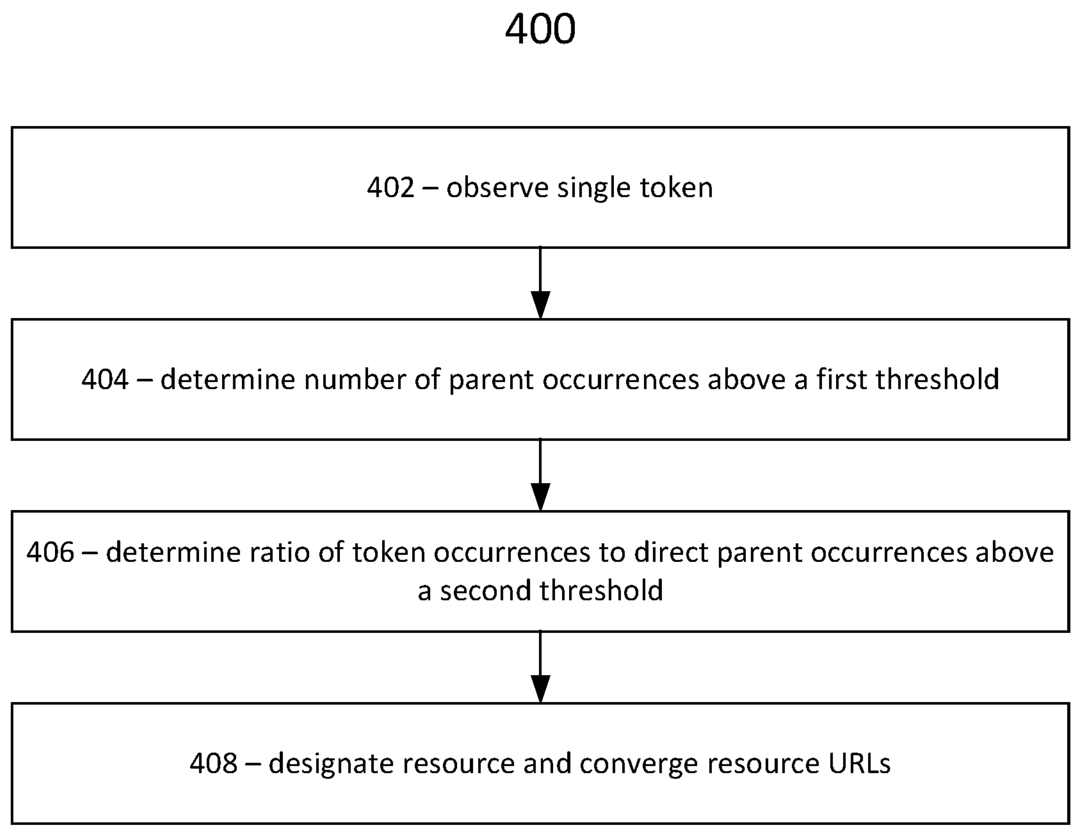
FIG. 4 shows an example first part of a second heuristic phase process according to some embodiments of the disclosure.
Figure 5:
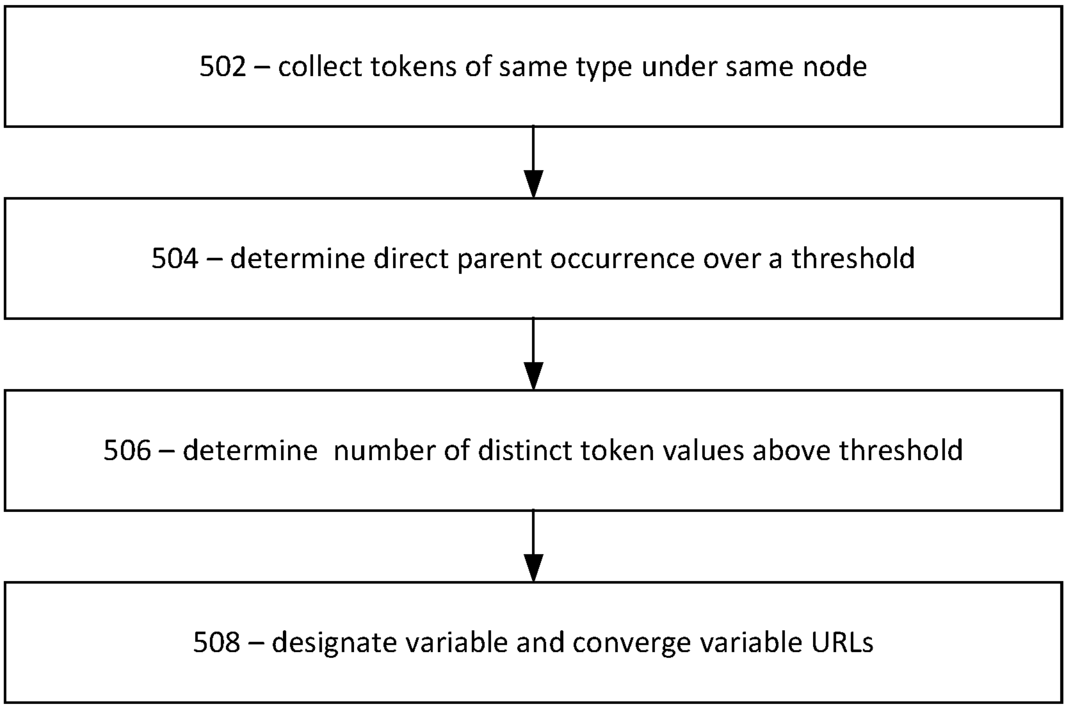
FIG. 5 shows an example second part of a second heuristic phase process according to some embodiments of the disclosure.

FIGS. 3-5 show the heuristic subsets of process 200 in detail with illustrative, but not limiting, examples included to demonstrate how the disclosed embodiments can translate live or collected API traffic data into a standard trie format enabling rapid classification and/or construction of messages to and/or from an endpoint 20.

FIG. 3 shows an example first heuristic phase process 300 according to some embodiments of the disclosure. For example, system 100 can perform process 300 to generate tokens and identify one or more variables through a matching process such as matching one or more regular expressions. In some embodiments, identification of variables at this stage may be optional, such that all variables are identified in the process of FIG. 5 or similar processing in those embodiments.

At 302, first phase processing 110 can divide endpoint data (e.g., as received at 202 of process 200) into one or more tokens. Each of one or a plurality of URLs received as described above may be divided into tokens per hierarchical path segment. For example, "/band/12345670/member/simonlebon" may be divided into four tokens ("band", "12345670", "member", and "simonlebon").

At 304, first phase processing 110 can perform a matching process for tokens generated at 302. System 100 can identify one or more tokens having at least one known format, for example by matching content of the one or more tokens with one or more regular expressions. Embodiments can use a variety of regular expressions in any combinations including, but not limited to, timestamp in string format, timestamp in numeric format, unique user id (UUID), email, account in a known format, social security number (SSN), etc. As an example, "550e8400-e29b-41d4-a716-446655440000" may match a regular expression for some data type (e.g., a UUID), or from the example above "12345670" may match a regular expression for an Integer data type Embodiments may provide default regular expressions and/or may allow customization of regular expressions. For example, vehicle identification number (VIN) is used in some APIs employed within the automobile industry, and embodiments of system 100 used within the automobile industry may add VIN as a regular expression that can be evaluated.

At 306, first phase processing 110 can designate tokens identified as matching a type of variable at 304 as being variables. System 100 may thereby classify one or more hierarchical levels associated with the one or more tokens having at least one known format as representing at least one variable. For example, for each token identified as matching a regular expression at 304, system 100 may classify the token as a variable and create a new original URL entry by replacing the variables with {variable-id}. Examples may be as follows:

/band/12345670/member/simonlebon⇒/band/{band-id}/member/simonlebon

/band/12345670/member/johntaylor⇒/band/{band-id}/member/johntaylor

/band/98765432/member/rogerwaters⇒/band/{band-id}/member/rogerwaters

Accordingly, after performing process 300, system 100 may have identified some or all variable trie levels for URLs associated with endpoint 20.

FIG. 4 shows an example first part of a second heuristic phase process 400 according to some embodiments of the disclosure. System 100 may perform process 400 to classify tokens not already classified by process 300, or as an initial classification measure for embodiments where no matching of regular expressions is performed. By performing process 400, system 100 can identify tokens representing resources. System 100 may perform process 400 on a per-token basis in some embodiments, evaluating multiple tokens by repeating process 400 for each token under evaluation.

At 402, second phase processing 120 can select and observe a single token for evaluation. This can include obtaining data providing a record of instances of the token's occurrence in the traffic data for endpoint 20.

At 404, second phase processing 120 can measure a number of parent occurrences and determine whether this number is above a first threshold. The threshold may be calculated or user defined and may be customized for the endpoint 20 under analysis in some embodiments. For example, endpoints 20 with wide usage and/or heavy network traffic may require higher threshold values than endpoints 20 with lower traffic and less resulting data. In any event, it may be useful for the results of processing 400 to be evaluated by an expert or a ML process that can adjust the threshold value if tokens are wrongly classified. In cases where no tokens have parent occurrences above the first threshold, second phase processing 120 may wait for more samples to arrive before proceeding with process 400 in some embodiments. In other embodiments, if no tokens have parent occurrences above the first threshold, process 400 may end, and system 100 may move to the second part of second heuristic phase process, described in detail below with respect to FIG. 5.

At 406, for tokens with parent occurrences above the first threshold, second phase processing 120 can measure a ratio of token occurrences to direct parent occurrences and determine whether this ratio is above a second threshold. The threshold may be calculated or user defined and may be customized for the endpoint 20 under analysis in some embodiments. For example, endpoints 20 with wide usage and/or heavy network traffic may require lower threshold values than endpoints 20 with lower traffic and less resulting data, or alternatively, ratio threshold may differ between cases where the number of distinct tokens' values is high or low. In any event, it may be useful for the results of processing 400 to be evaluated by an expert or a ML process that can adjust the threshold value if tokens are wrongly classified. In cases where no ratios above the second threshold are observed, process 400 may end, and system 100 may move to the second part of second heuristic phase process, described in detail below with respect to FIG. 5.

At 408, second phase processing 120 can identify a token with the number above the first threshold as determined at 404 and the ratio above the second threshold at 406 as a resource, and second phase processing 120 can converge resource URLs. System 100 may be able to designate the token as a resource after processing at 404 and 406 because the values above the first and second thresholds indicate a low degree of variance for the token, suggesting it is likely to represent a resource. The use of the ratio threshold prevents system 100 from ignoring rare message types that may not appear often in traffic data but, when they do appear, adhere to a consistent format pattern.

As an example, a partial list of URLs may be as follows:

/band/{band-id}/member/simonlebon

/band/{band-id}/member/johntaylor

/band/{band-id}/member/andytaylor

/band/{band-id}/member/rogertaylor

/band/{band-id}/member/nickrhodes

/band/{band-id}/member/simoncolley
/band/{band-id}/member/rogerwaters
/band/{band-id}/member/davidgilmour
/band/{band-id}/name/duranduran
/band/{band-id}/name/pinkfloyd In the above list, system 100 may determine that "member" represents a resource owing to a high ratio of occurrences of "member" to occurrences of its direct parent "{band-id}" (which may be a variable as determined by processing 300 described above) and a high number of occurrences of "{band-id}" in the overall set. For purposes of determining the overall set, system 100 may only consider and compare tokens at a same hierarchy for data of a same type (e.g., tokens for integers, tokens for email addresses, etc.) in some embodiments.

System 100 can converge resources identified through the above processing, for example by spanning the respective hierarchical path segments into a trie structure and producing one token per trie level per URL (as described above) and then reducing all tokens for all of the plurality of URLs at the at least one first hierarchical level to a single resource trie level and reducing all sub-tries under the single resource trie level under a same node.

FIG. 5 shows an example second part of a second heuristic phase process 500 according to some embodiments of the disclosure. System 100 may perform process 500 to classify tokens not already classified by process 300 and/or process 400. By performing process 500, system 100 can identify tokens representing variables. System 100 can perform process 500 after performing process 400, starting from a set of endpoint 20 data with resources identified and tries filled in accordingly, as described above.

At 502, second phase processing 120 can collect tokens of a same type under a same node across the data resulting from performing process 400. Continuing the previous example, this may result in two separate collections of data, each of which may be evaluated separately. A first collection may be as follows, collapsed under the "member" resource node:

/band/{band-id}/member/simonlebon
/band/{band-id}/member/johntaylor
/band/{band-id}/member/andytaylor
/band/{band-id}/member/rogertaylor
/band/{band-id}/member/nickrhodes
/band/{band-id}/member/simoncolley
/band/{band-id}/member/rogerwaters
/band/{band-id}/member/davidgilmour A second collection may be as follows, collapsed under the "name" resource node:

/band/{band-id}/name/duranduran
/band/{band-id}/name/pinkfloyd

At 504, second phase processing 120 can measure a number of parent occurrences and determine whether this number is above a third threshold. The threshold may be calculated or user defined and may be customized for the endpoint 20 under analysis in some embodiments. For example, endpoints 20 with wide usage and/or heavy network traffic may require higher threshold values than endpoints 20 with lower traffic and less resulting data. In any event, it may be useful for the results of processing 500 to be evaluated by an expert or a ML process that can adjust the threshold value if tokens are wrongly classified. In cases where no tokens have parent occurrences above the third threshold, second phase processing 120 may wait for more samples to arrive before proceeding with process 500 in some embodiments. In other embodiments, if no tokens have parent occurrences above the third threshold, second phase processing 120 may reduce the threshold and perform processing at 504 again with the lower threshold. In other embodiments, if no tokens have parent occurrences above the third threshold, second phase processing 120 may return an indication that there is not enough data to perform processing at 504, and in at least some cases, process 500 may end.

At 506, second phase processing 120 can measure a number of distinct token values under a node and determine whether this number is above a fourth threshold. The threshold may be calculated or user defined and may be customized for the endpoint 20 under analysis in some embodiments. For example, endpoints 20 with wide usage and/or heavy network traffic may require higher threshold values than endpoints 20 with lower traffic and less resulting data. In any event, it may be useful for the results of processing 500 to be evaluated by an expert or a ML process that can adjust the threshold value if tokens are wrongly classified. In cases where no ratios above the fourth threshold are observed, second phase processing 120 may reduce the threshold and perform processing at 506 again with the lower threshold. In other embodiments, if no tokens have parent occurrences above the third threshold, second phase processing 120 may return an indication that there is not enough data to perform processing at 506, and in at least some cases, process 500 may end.

At 508, second phase processing 120 can identify a token with a number above a third threshold as determined at 504 and a number above the fourth threshold at 506 as a variable, and second phase processing 120 can converge variable URLs. System 100 may be able to designate the token as a variable after processing at 504 and 506 because the value above the fourth threshold indicates a high degree of variance for the token, while the value above the third threshold indicates a low degree of variance for the parent, suggesting that the token likely represents a variable node below a resource node (or, in some embodiments, a variable node below another variable node).

System 100 can further converge resources identified through the above processing by reducing all tokens for all of the plurality of URLs at the at least one second hierarchical level to a single variable trie level and reducing all sub-tries under the single variable trie level under a same node. As an example, processing 500 on the above two collections may yield the following standard format for the two types of endpoint 20 traffic data represented by the two collections:

/band/{band-id}/member/{member-id}
/band/{band-id}/name/{name-id} where {member-id} is a variable for the "member" resource and {name-id} is a variable for the "name" resource.

Note that the above processing can converge levels and diverge levels into subtries. For example, the illustrative levels above converge to /band/{band-id}/ but then diverge again into /member/ and /name/ subtries.

Figure 6:
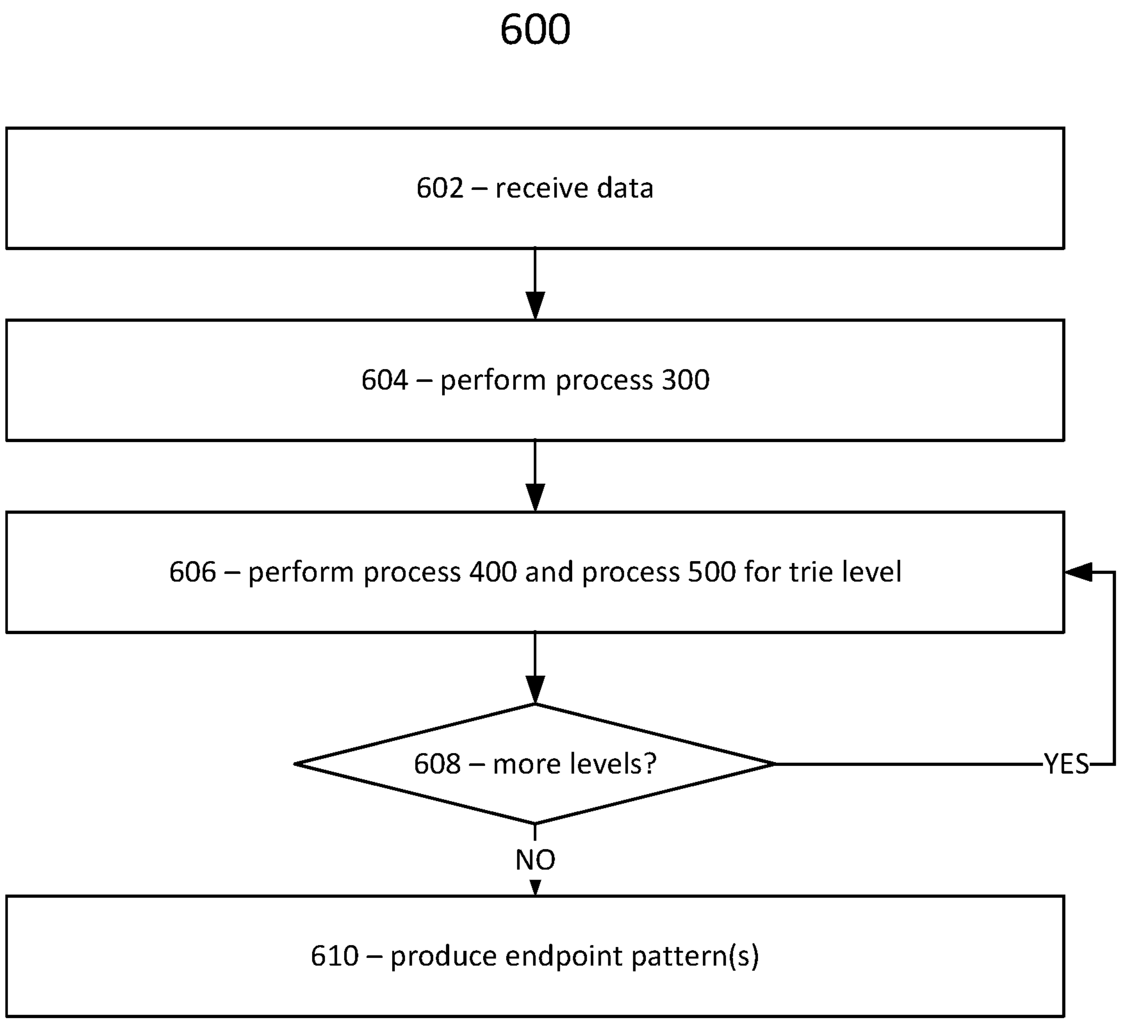
FIG. 6 shows an example of processing a set of endpoint data according to some embodiments of the disclosure.

FIG. 6 shows an example of processing a set of endpoint data 600 according to some embodiments of the disclosure. While the above description of processes 200, 300, 400, and 500 provides an algorithmic explanation of how system 100 determines a standard format of endpoint patterns for an endpoint 20, processing example 600 applies the above processes 200, 300, 400, and 500 to a sample data set to illustrate the trie configuration after each level is processed.

At 602, system 100 may receive endpoint 20 data and tokenize the data as required. In this example, the input data is as follows:

company/234234/member/adam company/144445/member/abraham
company/237777/member/jacob
company/987666/member/abel
company/65789/member/david
company/1112222/report/4545454
company/1112222/report/1234444
company/1112222/report/666699999
company/1112222/report/4444333222/filename/annual56.pdf
company/1112222/report/11122223333/filename/quarter3.pdf
company/1112222/report/123456/filename/Quarter1.pdf
company/677777/year/1978
company/987665/year/1979
company/5466666/year/1980

At 604, system 100 may perform process 300 to identify variables using regular expression matching. After performing this processing, the trie data may be as follows:

Company→{company-id}→member→adam
→member→abraham
→member→jacob
→member→abel
→member→david
→report→4545454
→report→1234444
→report→666699999
→report→4444333222→filename→annual56.pdf
→report→11122223333→filename→quarter3.pdf
→report→123456→filename→Quarter1.pdf
→year→1978
→year→1979
→year→1980

At 606, system 100 may perform process 400 and process 500 for one of the trie levels (e.g., the first trie level in the hierarchy). After performing this processing, the trie data may be as follows:

Company→{company-id}→member→adam
→abraham
→jacob
→abel
→david
→report→4545454
→1234444
→666699999
→4444333222→filename→annual56.pdf
→11122223333→filename→quarter3.pdf
→123456→filename→Quarter1.pdf
→year→1978
→1979
→1980

At 608, system 100 may proceed down the trie levels, determining whether any more remain to be evaluated. If any trie levels remain, system 100 may perform process 400 and process 500 on the remaining tree levels recursively as shown. In the present example, after a next level of processing, the trie data may be as follows:

Company→{company-id}→member→{member-id}
→report→{report-id}
→filename→
annual56.pdf
→filename→quarter3.pdf
→filename→Quarter1.pdf
→year→{year-id}

The present example has two trie levels remaining, so system 100 can process the next level, and thereafter the trie data may be as follows:

Company→{company-id}→member→{member-id}
→report→{report-id}
→filename→
annual56.pdf
→quarter3.pdf
→
Quarter1.pdf
→year→{year-id}

After system 100 processes the final level, the trie data may be as follows:

Company→{company-id}→member→{member-id}
→report→{report-id}
→filename→{filename-id}
→year→{year-id}

Once all trie levels have been processed, at 610, system 100 can produce the standard format endpoint pattern(s) for endpoint 20. In the present example, these may be as follows:

Company/{company-id}/member/{member-id}
Company/{comapny-id}/report/{report-id}
Company/{comapny-id}/report/{report-id}/filename/{filename-id}
Company/{comapny-id}/year/{year-id}

With these endpoint patterns in place, system 100 and/or other device(s) 30 can quickly identify and sort traffic data in a traffic monitoring operation for traffic to and/or from endpoint 20. Alternatively or additionally, system 100 and/or other devices 30 can use the endpoint patterns to construct messages corresponding to the endpoint 20 API format. Accordingly, system 100, and/or other device(s) receiving endpoint standard format data from system 100, can automatically configure monitoring and/or messaging systems for use with endpoint 20. This may be contrasted with known methods such as SWAGGER or API management systems, where endpoints are documented manually or from source code analysis (rather than traffic analysis) and therefore require access to source code or user documentation. Indeed, system 100 can even identify and classify undocumented or frequently updated endpoints 20.

Figure 7:
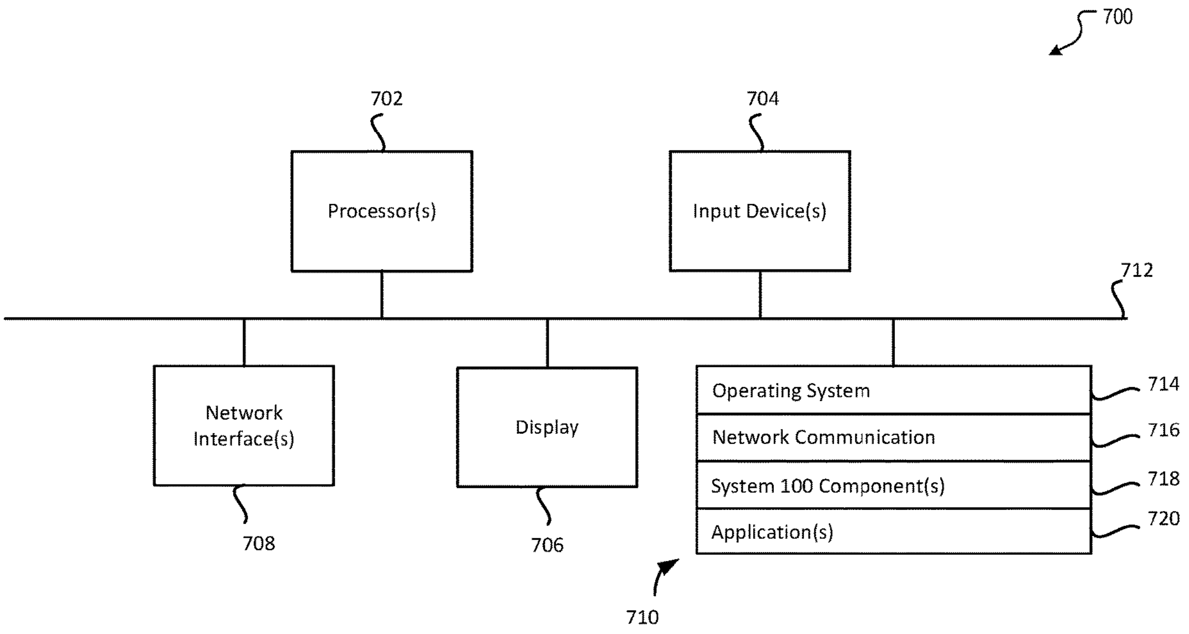
FIG. 7 shows a computing device according to some embodiments of the disclosure.

FIG. 7 shows a computing device 700 according to some embodiments of the disclosure. For example, computing device 700 may function as a single system 100 or any portion(s) thereof, or multiple computing devices 700 may function as a system 100.

Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 606; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

System 100 components 718 may include the system elements and/or the instructions that enable computing device 700 to perform functions of system 100 as described above. Application(s) 720 may be an application that uses or implements the outcome of processes described herein and/or other processes. In some embodiments, the various processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, “prompt engineering” to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term “at least one” may often be used in the specification, claims and drawings, the terms “a”, “an”, “the”, “said”, etc. also signify “at least one” or “the at least one” in the specification, claims and drawings.

Finally, it is the applicant's intent that only claims that include the express language “means for” or “step for” be interpreted under 35 U.S.C. 112(f). Claims that do not expressly include the phrase “means for” or “step for” are not to be interpreted under 35 U.S.C. 112(f).

What is claimed is:

1. A method comprising:

receiving, by at least one processor, a plurality of uniform resource locator (URL) paths each comprising a respective one or more hierarchical path segments;

for at least a subset of the URL paths, producing, by the at least one processor, respective tokens for respective hierarchical path segments of the at least the subset of the URL paths;

automatically determining, by the at least one processor, that at least one first hierarchical level of the plurality of URL paths represents at least one resource by performing processing comprising determining that at least one number of occurrences of at least one parent token to the at least one of the respective tokens is above a first threshold and at least one ratio of occurrence of the at least one of the respective tokens to the at least one parent token is above a second threshold;

automatically determining, by the at least one processor, that at least one second hierarchical level of the plurality of URL paths represents at least one variable by performing processing comprising determining that at least one number of occurrences of at least one parent token to the at least one of the tokens of the at least one second hierarchical level is above a third threshold and at least one number of occurrences of distinct values in tokens of the at least one second hierarchical level is above a fourth threshold;

automatically determining, by the at least one processor, a standard format of the plurality of URLs comprising the at least one resource and the at least one variable; and performing processing, by the at least one processor, utilizing the standard format for an application programming interface (API) associated with the plurality of URL paths.

2. The method of claim 1, wherein producing, by the at least one processor, the respective tokens comprises:

dividing each of the plurality of URL paths into tokens per hierarchical path segment;

identifying one or more tokens having at least one known format;

classifying one or more hierarchical levels associated with the one or more tokens having the at least one known format as representing at least one variable; and producing tokens not identified as having the at least one known format as the respective tokens.

3. The method of claim 2, wherein the identifying the one or more tokens having the at least one known format comprises matching content of the one or more tokens with one or more regular expressions.

4. The method of claim 1, wherein producing, by the at least one processor, the respective tokens comprises spanning the respective hierarchical path segments into a trie structure and producing one token per trie level per URL path.

5. The method of claim 4, wherein automatically determining, by the at least one processor, the standard format comprises:

reducing all tokens for all of the plurality of URL paths at the at least one first hierarchical level to a single resource trie level; and reducing all sub-tries under the single resource trie level under a same node.

6. The method of claim 4, wherein automatically determining, by the at least one processor, the standard format comprises:

reducing all tokens for all of the plurality of URL paths at the at least one second hierarchical level to a single variable trie level; and reducing all sub-tries under the single variable trie level under a same node.

7. The method of claim 1, wherein performing the processing, by the at least one processor, utilizing the standard format for an API associated with the plurality of URL paths comprises generating an analysis of traffic for the API.

8. A system comprising:

at least one processor; and a non-transitory computer-readable medium storing instructions that, when executed by the at least one processor, cause the at least one processor to perform processing comprising:

receiving a plurality of uniform resource locator (URL) paths each comprising a respective one or more hierarchical path segments;

for at least a subset of the URL paths, producing respective tokens for respective hierarchical path segments of the at least the subset of the URL paths;

automatically determining that at least one first hierarchical level of the plurality of URL paths represents at least one resource by performing processing comprising determining that at least one number of occurrences of at least one parent token to the at least one of the respective tokens is above a first threshold and at least one ratio of occurrence of the at least one of the respective tokens to the at least one parent token is above a second threshold;

automatically determining that at least one second hierarchical level of the plurality of URL paths represents at least one variable by performing processing comprising determining that at least one number of occurrences of at least one parent token to the at least one of the tokens of the at least one second hierarchical level is above a third threshold and at least one number of occurrences of distinct values in tokens of the at least one second hierarchical level is above a fourth threshold;

automatically determining a standard format of the plurality of URLs comprising the at least one resource and the at least one variable; and performing processing utilizing the standard format for an application programming interface (API) associated with the plurality of URL paths.

9. The system of claim 8, wherein producing the respective tokens comprises:

dividing each of the plurality of URL paths into tokens per hierarchical path segment;

identifying one or more tokens having at least one known format;

classifying one or more hierarchical levels associated with the one or more tokens having the at least one known format as representing at least one variable; and producing tokens not identified as having the at least one known format as the respective tokens.

10. The system of claim 9, wherein the identifying the one or more tokens having the at least one known format comprises matching content of the one or more tokens with one or more regular expressions.

11. The system of claim 8, wherein producing the respective tokens comprises spanning the respective hierarchical path segments into a trie structure and producing one token per trie level per URL.

12. The system of claim 11, wherein automatically determining the standard format comprises:

reducing all tokens for all of the plurality of URL paths at the at least one first hierarchical level to a single resource trie level; and reducing all sub-tries under the single resource trie level under a same node.

13. The system of claim 11, wherein automatically determining the standard format comprises:

reducing all tokens for all of the plurality of URL paths at the at least one second hierarchical level to a single variable trie level; and reducing all sub-tries under the single variable trie level under a same node.

14. The system of claim 8, wherein performing the processing utilizing the standard format for an API associated with the plurality of URL paths comprises generating an analysis of traffic for the API.

15. A method comprising:

receiving, by at least one processor, a plurality of uniform resource locator (URL) paths each comprising a respective one or more hierarchical path segments;

dividing, by the at least one processor, each of the plurality of URL paths into tokens per hierarchical path segment of respective hierarchical path segments of respective URL paths;

identifying, by the at least one processor, one or more tokens having at least one known format;

classifying, by the at least one processor, one or more hierarchical levels associated with the one or more tokens having the at least one known format as representing at least one variable;

producing, by the at least one processor, tokens not identified as having the at least one known format as respective unidentified tokens;

automatically determining, by the at least one processor, that at least one first hierarchical level of the plurality of URL paths represents at least one resource by performing a first statistical analysis, wherein the first statistical analysis comprises performing processing comprising determining that at least one number of occurrences of at least one parent token to the at least one of the respective tokens is above a first threshold and at least one ratio of occurrence of the at least one of the respective tokens to the at least one parent token is above a second threshold;

automatically determining, by the at least one processor, that at least one second hierarchical level of the plurality of URL paths represents at least one variable by performing a second statistical analysis, wherein the second statistical analysis comprises performing processing comprising determining that at least one number of occurrences of at least one parent token to the at least one of the tokens of the at least one second hierarchical level is above a third threshold and at least one number of occurrences of distinct values in tokens of the at least one second hierarchical level is above a fourth threshold;

automatically determining, by the at least one processor, a standard format of the plurality of URLs comprising the at least one resource and the at least one variable; and performing processing, by the at least one processor, utilizing the standard format for an application programming interface (API) associated with the plurality of URL paths.

16. The method of claim 15, wherein the identifying the one or more tokens having the at least one known format comprises matching content of the one or more tokens with one or more regular expressions.

17. The method of claim 15, wherein:

producing, by the at least one processor, the respective tokens comprises spanning the respective hierarchical path segments into a trie structure and producing one token per trie level per URL path;

automatically determining, by the at least one processor, the standard format comprises:

reducing all tokens for all of the plurality of URL paths at the at least one first hierarchical level to a single resource trie level, and reducing all sub-tries under the single resource trie level under a same node; and automatically determining, by the at least one processor, the standard format comprises:

reducing all tokens for all of the plurality of URL paths at the at least one second hierarchical level to a single variable trie level, and reducing all sub-tries under the single variable trie level under a same node.

18. The method of claim 15, wherein performing the processing, by the at least one processor, utilizing the standard format for an API associated with the plurality of URL paths comprises generating an analysis of traffic for the API.

* * * * *